(12) United States Patent
Xu et al.

(10) Patent No.: US 12,715,287 B1
(45) Date of Patent: Aug. 25, 2026

(54) CONTROL STRATEGIES TO REDUCE NVH DURING OPERATION OF VEHICLE AXLE DISCONNECT DEVICES

(71) Applicant: FCA US LLC, Auburn Hills, MI (US)

(72) Inventors: Chengyi Xu, Auburn Hills, MI (US); Rama Rohit Varma Sagi, Auburn Hills, MI (US); Krishna Chatanya Reddy Madireddy, Auburn Hills, MI (US); Nadirsh Patel, Auburn Hills, MI (US); Brandon Verhun, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 19/059,407

(22) Filed: Feb. 21, 2025

(51) Int. Cl.
*B60K 28/10* (2006.01)
*B60K 23/08* (2006.01)
*F16D 48/06* (2006.01)

(52) U.S. Cl.
CPC .............. *B60K 28/10* (2013.01); *B60K 23/08* (2013.01); *F16D 48/06* (2013.01); *B60K 2023/0841* (2013.01); *B60K 2023/0858* (2013.01); *F16D 2500/10462* (2013.01)

(58) Field of Classification Search
CPC ............................... B60K 28/10; B60K 23/08; B60K 2023/0841; B60K 2023/0858; F16D 27/118; F16H 2061/0474
See application file for complete search history.

(56) References Cited

U.S. PATENT DOCUMENTS 7,491,145 B2 2/2009 Mizon et al.
8,396,633 B2 3/2013 Buszek et al.
10,801,553 B2 10/2020 Averill et al.
11,725,702 B1 * 8/2023 Desing .................... F16D 11/14 192/84.92
12,366,268 B1 * 7/2025 Xu .......................... F16D 27/14
2017/0074380 A1 * 3/2017 Raghavan ............. F16D 27/118
2020/0114769 A1 * 4/2020 Moubarak ............ B60K 17/348
2024/0026938 A1 * 1/2024 Paielli ................... F16D 48/064
2024/0240677 A1 * 7/2024 Wynkoop ............ F16H 63/304

FOREIGN PATENT DOCUMENTS

KR 20030062098 A 7/2003

* cited by examiner

*Primary Examiner* — Tisha D Lewis
(74) *Attorney, Agent, or Firm* — Jeremy J. Klobucar

(57) ABSTRACT

An axle disconnect control system and method for an axle disconnect system of a vehicle, the axle disconnect system including a dog clutch, include a position sensor configured to measure a position of a solenoid of the dog clutch, wherein the solenoid is configured to move a first gear of the dog clutch to engage/disengage with a second gear of the dog clutch, wherein the first gear is connected to a powertrain of the vehicle and the second gear is connected to an axle or a wheel of the vehicle and a control system configured to perform, based on the measured position of the solenoid, velocity-based control of the solenoid to engage/disengage the first and second dog clutch gears to connect/disconnect the axle or the wheel of the vehicle to/from the powertrain of the vehicle, respectively.

20 Claims, 3 Drawing Sheets

300
1
2
3
4
Velocity (mm/s)
0
Solenoid Position 350
3
2
1
Solenoid Position
Velocity (mm/s)

CONTROL STRATEGIES TO REDUCE NVH DURING OPERATION OF VEHICLE AXLE DISCONNECT DEVICES

FIELD

The present application generally relates to vehicle axle disconnect systems and, more particularly, to control strategies to reduce noise/vibration/harshness (NVH) during operation of axle disconnect devices.

BACKGROUND

Vehicle axle disconnect systems include front axle disconnect (FAD) and wheel-end disconnect (WED) systems that are capable of selectively disconnecting a powertrain (an electric motor, an engine, or some combination thereof) from the vehicle's wheels. One type of disconnect device for FAD and WED systems includes a dog clutch disposed between a wheel/axle and the powertrain. The dog clutch includes a solenoid actuator that moves a lever connected to one dog clutch gear and the powertrain/axle relative to another dog clutch gear that is connected to the axle/wheel.

In such systems, there can be multiple sources of noise/vibration/harshness (NVH) that could be noticeable to a driver during vehicle axle disconnect/reconnect procedures. These sources of NVH include the solenoid hitting physical end stops, the dog clutch gear teeth hitting each other when misaligned, and wind-up current that causes excessively fast movement of the solenoid/lever and the dog clutch gear. Accordingly, while such conventional axle disconnect systems do work for their intended purpose, there exists an opportunity for improvement in the relevant art.

SUMMARY

According to one example aspect of the invention, an axle disconnect control system for an axle disconnect system of a vehicle, the axle disconnect system including a dog clutch, is presented. In one exemplary implementation, the axle disconnect control system comprises a position sensor configured to measure a position of a solenoid of the dog clutch, wherein the solenoid is configured to move a first gear of the dog clutch to engage/disengage with a second gear of the dog clutch, wherein the first gear is connected to a powertrain of the vehicle and the second gear is connected to an axle or a wheel of the vehicle and a control system configured to perform, based on the measured position of the solenoid, velocity-based control of the solenoid to engage/disengage the first and second dog clutch gears to connect/disconnect the axle or the wheel of the vehicle to/from the powertrain of the vehicle, respectively.

In some implementations, the velocity-based control of the solenoid to engage the first and second dog clutch gears to connect the axle or the wheel to the powertrain comprises (i) increasing a velocity of the solenoid to a target speed during a first period followed by (ii) holding the velocity of the solenoid constant at the target speed for a second period up until initial contact between the first and second dog clutch gears. In some implementations, the velocity-based control of the solenoid to engage the first and second dog clutch gears to connect the axle or the wheel to the powertrain further comprises (iii) after the initial contact between the first and second dog clutch gears, increasing the velocity of the solenoid above the target speed during a third period corresponding to a gear binding region followed by (iv) after gear binding between the first and second dog clutch gears, decreasing the velocity of the solenoid to zero during a fourth period as the solenoid approaches one of two end-stop positions. In some implementations, the control system is further configured to learn the two end-stop positions of the solenoid (i) before the first period and (ii) during or after the fourth period.

In some implementations, the velocity-based control of the solenoid to disengage the first and second dog clutch gears to disconnect the axle or the wheel from the powertrain comprises (i) increasing a velocity of the solenoid to a target speed during a first period corresponding to a gear binding region and up until the first and second dog clutch gears begin to disengage from each other. In some implementations, the velocity-based control of the solenoid to disengage the first and second dog clutch gears to disconnect the axle or the wheel from the powertrain further comprises (ii) after increasing the velocity of the solenoid to the target speed during the first period, holding the velocity of the solenoid constant at the target speed during a second period followed by (iii) decreasing the velocity of the solenoid to zero during a third period as the solenoid approaches one of two end-stop positions. In some implementations, the control system is further configured to learn the two end-stop positions of the solenoid (i) before the first period and (ii) during or after the third period.

In some implementations, the axle disconnect system is a front axle disconnect (FAD) system, the axle is a front axle of the vehicle, and the FAD system is configured to connect/disconnect the front axle from the powertrain. In some implementations, the axle disconnect system includes a wheel end disconnect (WED) system configured to connect/disconnect the wheel to/from the powertrain. In some implementations, the axle disconnect system includes a pair of WED systems, the axle is a front axle of the vehicle, and the WED systems are configured to connect/disconnect a pair of front wheels of the vehicle to/from the front axle.

According to another aspect of the invention, an axle disconnect control method for an axle disconnect system of a vehicle, the axle disconnect system including a dog clutch, is presented. In one exemplary implementation, the axle disconnect control method comprises monitoring, by a control system of the vehicle and using a position sensor for a solenoid of the dog clutch, a position of the solenoid, wherein the solenoid is configured to move a first gear of the dog clutch to engage/disengage with a second gear of the dog clutch, wherein the first gear is connected to a powertrain of the vehicle and the second gear is connected to an axle or a wheel of the vehicle and performing, by the control system and based on the position of the solenoid as provided by the position sensor, velocity-based control of the solenoid to engage/disengage the first and second dog clutch gears to connect/disconnect the axle or the wheel of the vehicle to/from the powertrain of the vehicle, respectively.

In some implementations, the velocity-based control of the solenoid to engage the first and second dog clutch gears to connect the axle or the wheel to the powertrain comprises (i) increasing, by the control system, a velocity of the solenoid to a target speed during a first period followed by (ii) holding, by the control system, the velocity of the solenoid constant at the target speed for a second period up until initial contact between the first and second dog clutch gears. In some implementations, the velocity-based control of the solenoid to engage the first and second dog clutch gears to connect the axle or the wheel to the powertrain further comprises (iii) after the initial contact between the first and second dog clutch gears, increasing, by the control system, the velocity of the solenoid above the target speed during a third period corresponding to a gear binding region followed by (iv) after gear binding between the first and second dog clutch gears, decreasing, by the control system, the velocity of the solenoid to zero during a fourth period as the solenoid approaches one of two end-stop positions. In some implementations, the axle disconnect control method further comprises learning, by the control system, the two end-stop positions of the solenoid (i) before the first period and (ii) during or after the fourth period.

In some implementations, the velocity-based control of the solenoid to disengage the first and second dog clutch gears to disconnect the axle or the wheel from the powertrain comprises (i) increasing, by the control system, a velocity of the solenoid to a target speed during a first period corresponding to a gear binding region and up until the first and second dog clutch gears begin to disengage from each other. In some implementations, the velocity-based control of the solenoid to disengage the first and second dog clutch gears to disconnect the axle or the wheel from the powertrain further comprises (ii) after increasing the velocity of the solenoid to the target speed during the first period, holding, by the control system, the velocity of the solenoid constant at the target speed during a second period followed by (iii) decreasing, by the control system, the velocity of the solenoid to zero during a third period as the solenoid approaches one of two end-stop positions. In some implementations, the axle disconnect control method further comprises learning, by the control system, the two end-stop positions of the solenoid (i) before the first period and (ii) during or after the third period.

In some implementations, the axle disconnect system is a front axle disconnect (FAD) system, the axle is a front axle of the vehicle, and the FAD system is configured to connect/disconnect the front axle from the powertrain. In some implementations, the axle disconnect system includes a wheel end disconnect (WED) system configured to connect/disconnect the wheel to/from the powertrain. In some implementations, the axle disconnect system includes a pair of WED systems, the axle is a front axle of the vehicle, and the WED systems are configured to connect/disconnect a pair of front wheels of the vehicle to/from the front axle.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, vehicle axle disconnect systems include front axle disconnect (FAD) and wheel-end disconnect (WED) systems that are capable of selectively disconnecting a powertrain (an electric motor, an engine, or some combination thereof) from the vehicle's wheels. One type of disconnect device for FAD and WED systems includes a dog clutch disposed between a wheel/axle and the powertrain. The dog clutch includes an electronic solenoid-type actuator that moves a lever connected to one dog clutch gear and the powertrain/axle relative to another dog clutch gear that is connected to the axle/wheel. In such systems, there can be multiple sources of noise/vibration/harshness (NVH) that could be noticeable to a driver during vehicle axle disconnect/reconnect procedures.

These sources of NVH include the solenoid hitting physical end stops, the dog clutch gear teeth hitting each other when misaligned, and wind-up current that causes excessively fast movement of the solenoid/lever and the dog clutch gear. One possible solution to this problem is closed-loop position-based feedback control of the solenoid. This solution, however, can result in a situation where the solenoid position overshoots a target position profile, thereby causing the system to pull back or retract the solenoid. This back/forth movement of the solenoid and the lever connected to one of the dog clutch gears can cause NVH due lash between the dog clutch gear teeth.

Accordingly, improved techniques are presented herein that utilize velocity-based control of the dog clutch solenoid. The velocity target is always in the same direction, which prevents the solenoid from moving backwards. The velocity target is also chosen so that a safe minimum velocity is used throughout the travel. Engagement comprises (i) initial preparation, (ii) slowly increasing the solenoid velocity to the target velocity, (iii) hold constant at the target velocity prior to dog clutch gear teeth contact, (iv) after contact, increasing the solenoid velocity across a gear binding region, and (v) final slow-down. Disengagement involves the same steps in the opposite direction/order. Potential benefits include reduced NVH during vehicle axle disconnect/reconned procedures, reduced component wear, and an improved driver experience.

Figure 1A:
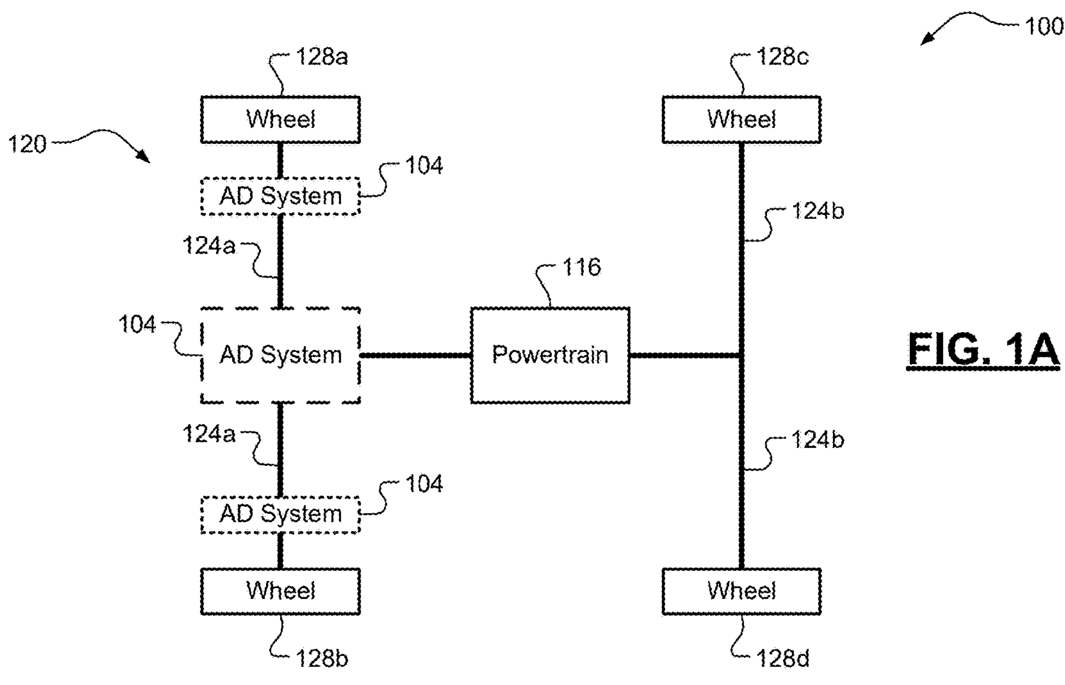
FIGS. 1A-1B are diagrams of an example vehicle having an axle disconnect system including a dog clutch and an example axle disconnect control system according to the principles of the present application.
Figure 1B:
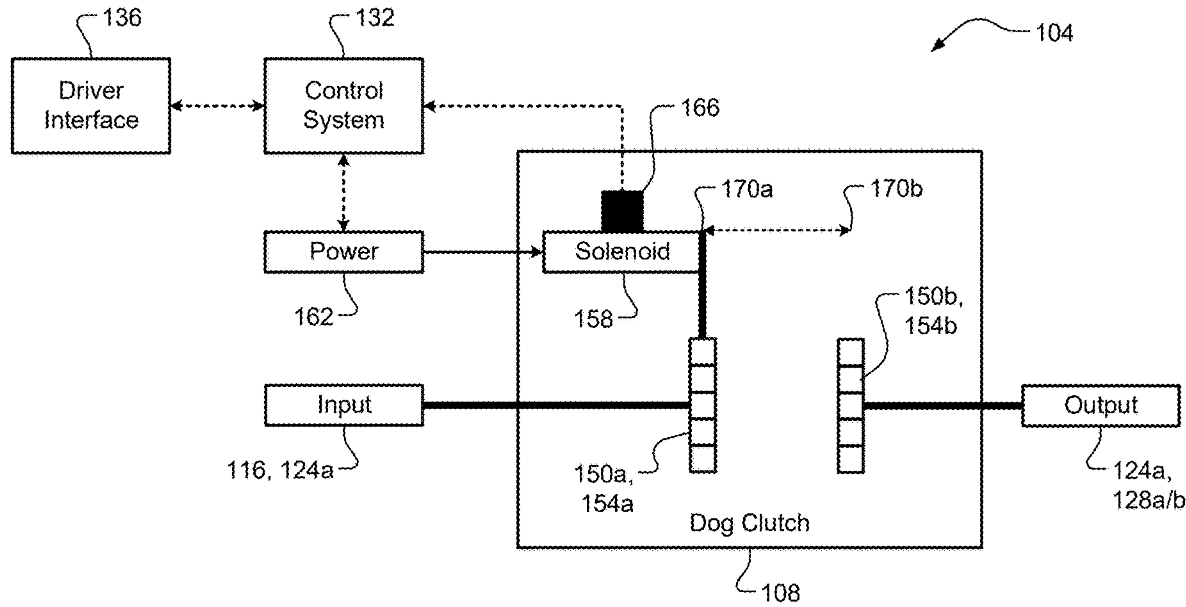

Referring now to FIGS. 1A-1B, diagrams of a vehicle 100 having an axle disconnect (AD) system 104 comprising a dog clutch 108 and an axle disconnect control system 112 according to the principles of the present application are illustrated. The vehicle 100 generally comprises a powertrain 116 configured to generate and transfer drive torque to a driveline 120, which comprises front and rear half-shafts or axles 124*a*, 124*b* and four hubs or wheels 128*b*-128*d*. It will be appreciated that the driveline 120 could further comprise other non-illustrated components, such as a differential. As shown, the axle disconnect system 104 could be configured as a FAD system (for disconnecting the powertrain 116 from the front axle 124*a*) a or a pair of WED systems (for disconnecting the powertrain 116 from the front wheels 128*a*, 128*b*.

The powertrain 116 include a torque generating system comprising one or more electric traction motors, an internal combustion engine, or some combination thereof. The powertrain 116 can also include a transmission or similar torque transfer system (e.g., a gearbox or gear reducer). In one exemplary embodiment, the powertrain 116 comprises a front electric traction motor associated with the front axle 124*a* and a second electric traction motor associated with the rear axle 128*b*, as well as an optional engine that could be configured with a motor-generator unit (MGU) to convert mechanical energy generated by the engine into electrical energy for recharging a high voltage battery pack or system that powers the electric traction motor(s). The axle disconnect system, however, may only be associated with the front axle 124*a* to provide selective all-wheel drive (AWD) capability and to not interfere with the second electric traction motor and torque provided primarily at the rear axle 124*b*.

As mentioned above, the axle disconnect system 104 comprises at least one dog clutch 108. The dog clutch 108 is a solenoid-controlled device that comprises first and second dog clutch gears 150*a*, 150*b* each having respective gear dogs or teeth 154*a*, 154*b* that are configured to mesh with each other during gear connection or binding. While referred to as "dogs/teeth," it will be appreciated that one of the dog clutch gears (e.g., dog clutch gear 150*b*) could have a ring configuration defining slots that respective protruding dogs/teeth (e.g., dogs/teeth 154*a* of a hub of dog clutch gear 150*a*) can fit into. There The first dog clutch gear 150*a* is connected to the powertrain 116 (for a FAD embodiment) or the front axle 124*a* (for a WED embodiment) and the second dog clutch gear 150*b* is connected to the front axle 124*a* (for a FAD embodiment) or the front wheels 128*a* and 128*b* (for a WED embodiment).

The first dog clutch gear 150*a* is movable by a lever 154 that is connected to an electronic solenoid 158. The solenoid 158 is energized and deenergized (e.g., by an inverter 162 or other power supply and control device) to laterally move the lever 154 and the first dog clutch gear 150*a* towards/away from the second dog clutch gear 150*b* to engage or disengage the first and second dog clutch gears 150*a*, 150*b* and, in turn, connect or disconnect the respective components on opposing sides of the axle disconnect system 104. A position sensor 166 is configured to monitor a position of the solenoid 158 and, in turn, the position of the lever 154 and the first dog clutch gear 150*a*. This position can be movable between two end-stop positions 170*a*, 170*b* corresponding to full disengagement or disconnection and full engagement or connection of the axle disconnect system 104. By measuring the change in position of the solenoid 158, the velocity of the solenoid 158 can also be monitored.

A controller or control system 132 of the vehicle 100 is configured to control various operational aspects of the vehicle 100, including, but not limited to, controlling the powertrain 116 to generate a sufficient amount of drive torque to satisfy a driver torque request (e.g., provided by a driver of the vehicle 100 via a driver interface 136, such as an accelerator pedal). Depending on a magnitude of the driver torque request and other operational parameters of the vehicle 100 (speed, temperature, battery state of charge (SOC) limits/constraints of the powertrain 116, etc.), the control system 132 could command the axle disconnect system 104 to connect or disconnect the front axle 124*a* or front wheels 128*a*, 128*b* from the powertrain 116. This could include the control system 136 performing velocity-based control of the solenoid 158 of the dog clutch 108.

Figure 2:
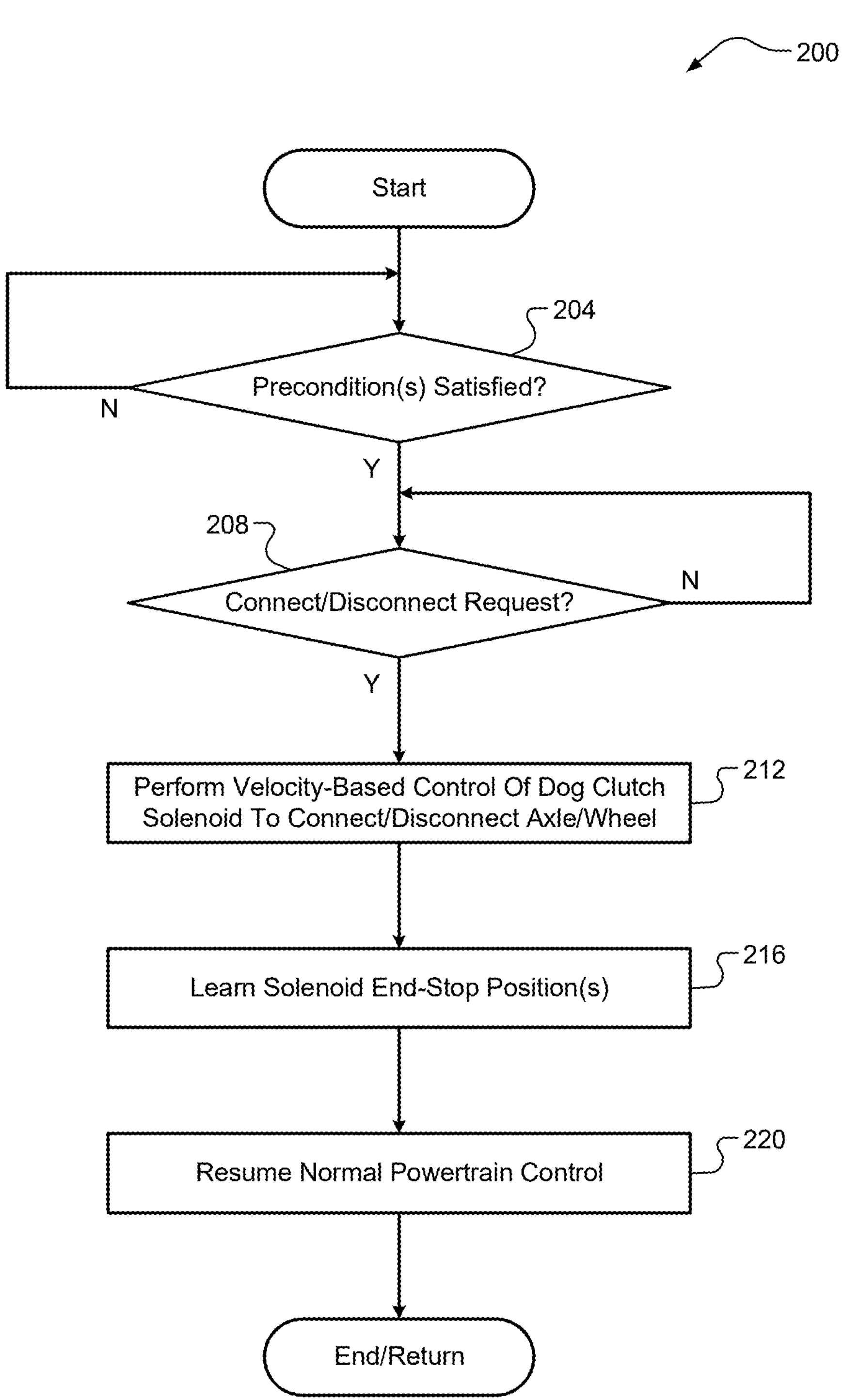
FIG. 2 is a flow diagram of an example velocity-based control method of a solenoid of a dog clutch for axle disconnection/reconnection in a vehicle according to the principles of the present application.
Figures 3A, 3B:
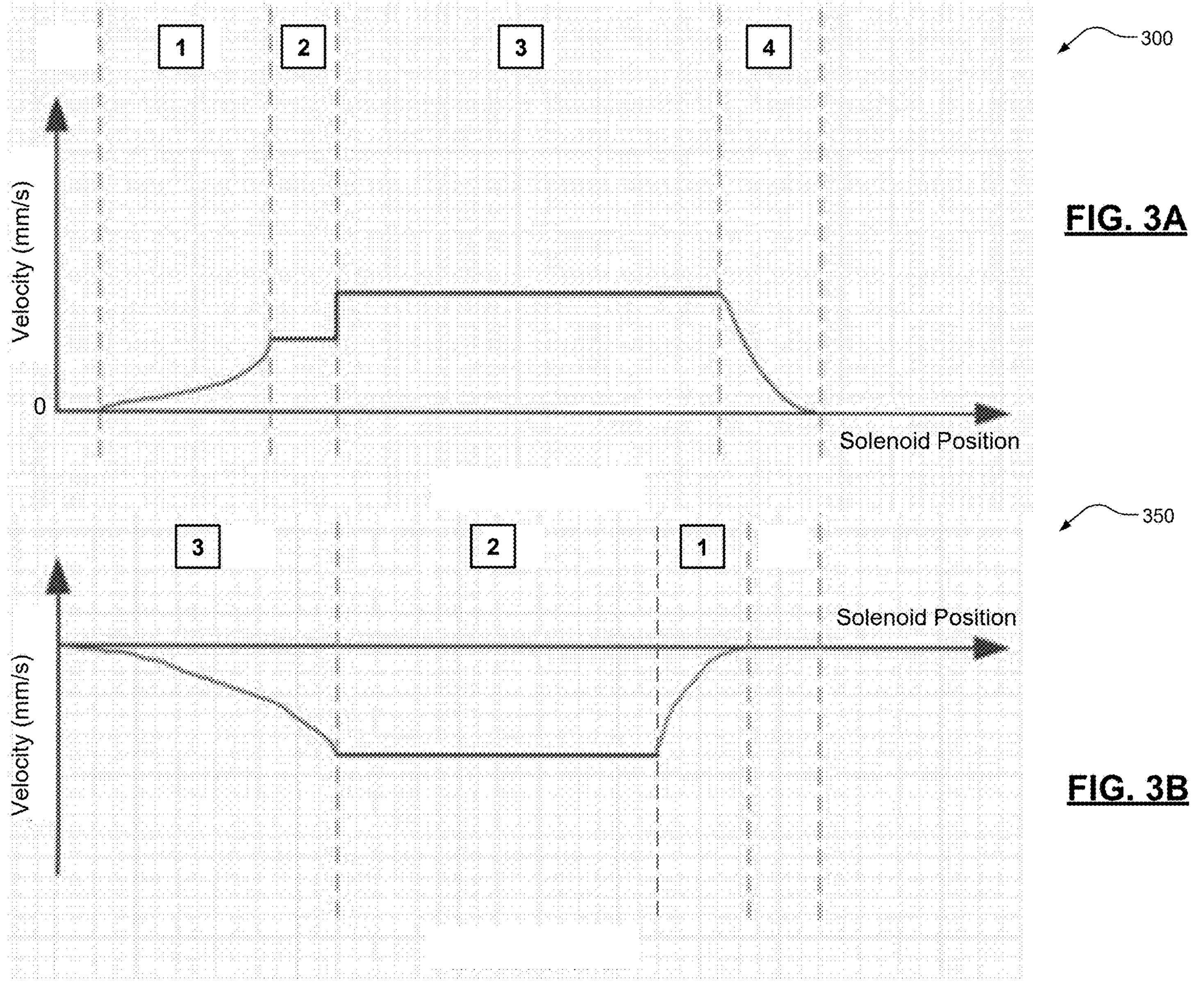
FIGS. 3A-3B are plots of example engagement and disengagement of the dog clutch via velocity-based solenoid control techniques according to the principles of the present application.

Referring now to FIGS. 2 and 3A-3B, and with continued reference to FIGS. 1A-1B, a flow diagram of an example velocity-based control method 200 of a solenoid of a dog clutch for axle disconnection/reconnection in a vehicle and a plots 300, 350 of example engagement and disengagement of the dog clutch via the velocity-based solenoid control techniques according to the principles of the present application are illustrated. The method 200 begins at 204 where the control system 132 optionally determines whether an optional set of one or more preconditions are satisfied. This could include, for example only, the vehicle 100 being powered up and operating in an acceptable drive mode (e.g., drive) and there being no malfunctions or faults present that would negatively affect or otherwise impact the operation of the techniques of the present application. When false, the method 200 ends or returns to 204. When true, the method 200 proceeds to 208.

At 208, the control system 132 determines whether a request to control the axle disconnect system 104 has been generated. This could be in response to, for example, a change in vehicle speed and/or driver torque request that necessitates an axle disconnect/reconnect operation. When false, the method 200 returns to 208. When true, the method 200 proceeds to 212. At 212, the control system 132 performs velocity-based control of the solenoid 158 to engage/disengage the first and second dog clutch gears 150*a* and 150*b* to connect/disconnect the axle 124*a* or the wheels 128*a*, 128*b* from the powertrain 116 (e.g., via axle 124*a*). This step 212 includes monitoring, by the control system 132, of the position of the solenoid 158 using the position sensor 166. The velocity-based control of the solenoid 158 can differ for engagement and disengagement operations as illustrated in FIGS. 3A-3B.

For an engagement or connection/reconnection operation as illustrated in plot 300 of FIG. 3A, for example, the velocity-based control includes, from left to right, an initial preparation period prior to (prior to Period 1) increasing the velocity of the solenoid 158 to a target speed during a first period (Period 1) followed by holding the velocity of the solenoid 158 constant at the target speed for a second period (Period 2) up until initial contact between the first and second dog clutch gears 150*a* and 150*b*. After the initial contact between the first and second dog clutch gears 150*a* and 150*b*, the velocity-based control includes increasing the velocity of the solenoid 158 above the target speed during a third period (Period 3) corresponding to a gear binding region followed by, after gear binding between the first and second dog clutch gears 150*a* and 150*b*, decreasing the velocity of the solenoid to zero during a fourth period (Period 4) as the solenoid 158 approaches one of two end-stop positions (i.e., end-stop position 170*b*).

For disengagement or disconnection operation as illustrated in plot 350 of FIG. 3B, for example, the velocity-based control includes, from right to left (the opposite of FIG. 3A), an initial preparation period prior to (prior to Period 1) increasing the velocity of the solenoid 158 to a target speed during a first period (Period 1) corresponding to a gear binding region and holding the velocity of the solenoid 158 constant at the target speed during a second period (Period 2) up until the first and second dog clutch gears 150*a* and 150*b* begin to and finally physically disengage from each other. After holding the velocity of the solenoid 158 constant at the target speed during the second period (Period 2) when the first and second dog clutch gears 150*a*, 150*b* physically disengage from each other, the velocity-based control includes decreasing the velocity of the solenoid 158 to zero during a third period (Period 3) as the solenoid approaches one of two end-stop positions (i.e., end-stop position 170*a*).

At optional 216, the control system 132 can optionally learn one or both of the end-stop positions 170*a* and 170*b* during the movement of the solenoid 158. In one example embodiment, the control system 132 can learn end-stop position 170*b* at the completion of the engagement operation and the control system can learn end-stop position 170*a* at the completion of the disengagement operation. The learning of these end-stop positions 170*a* and 170*b* over time provides for more accurate control of the dog clutch 108 during subsequent disconnection/reconnection operations of the axle disconnect system. For example, these learned position values could be stored in a memory (not shown) of the control system 132 and then utilized during the velocity-based control of the solenoid 158 for more precise controls and thus even further reduced NVH. At 220, the control system 132 can resume normal torque control of the powertrain 116 based on the now connected/disconnect state of the axle disconnect system 104. The method 200 then ends or returns to 204.

In contrast to the position profiled closed-loop control of the previous solution as previously described herein, the velocity-based control of the present application ensures that the solenoid 158 is always traveling in the same direction (not backwards) and a velocity profile or target is chosen so that a safe minimum velocity is used throughout the travel of the solenoid 158. As such, the position of the solenoid 158 is control with a fixed target velocity at each stage of travel. In one example embodiment, closed-loop control based on the position of the solenoid 158 could still be utilized. For this closed-loop control, every time the solenoid 158 is stopped during the actuation, the error is reset and unlearned so that there is no remaining closed-loop current after the solenoid 158 starts to move again. This greatly helps to unwind previously integrated error that occurred in the previous position profile based solutions and would often cause the dog clutch gears 150*a*, 150*b* to ram into each other or the solenoid 158 to ram into one of the end-stop positions 170*a*, 170*b*, thereby causing the NVH that could be noticeable to a driver of the vehicle 100.

In one example embodiment, an open-loop integral term is utilized and can be calculated as follows:

$$I_{OL} = I_{jitter} + I_{friction} + I_{cancel}. \quad (1)$$

In Equation (1), the $I_{jitter}$ term is useful to help the solenoid 158 keep moving. This small vibration (jitter) also helps the solenoid 158 not get stuck during the travel. Also, the magnitude of the solenoid 158 is also carefully controlled so that near the end-stops 170*a*, 170*b* and near the gear teeth contact or binding region, the jitter doesn't increase the vibration at the contact. The $I_{friction}$ term is divided to two parts so that there is always a term to move the solenoid 158: (1) static friction, when the solenoid 158 is not moving, and (2) kinetic friction, when the solenoid 158 is moving. To determine if the solenoid 158 is moving or not, the position feedback is used to calculate the derivative of the position to get the velocity. Sometimes, there can also be a gear binding happening at the very end of the travel. At this time, the closed-loop integral term (I-term) is reset to zero and the static friction starts to ramp in. At this time, the static friction cannot be too big so that the current slams the solenoid 158 into the end-stop (e.g., end-stop position 170*a*).

However, at the same time, the current cannot be too small so that the gear binding is stopping the solenoid 158 from moving. Based on the solenoid position, the static friction is thereby reduced to reduce chances of high solenoid velocity closer to end-stop. As a result, a two-stage static friction is introduced at the end of the travel: (1) once the gear binding is detected (solenoid velocity less than a velocity threshold) near the end of the travel (solenoid position greater than a position threshold), a small static friction current is applied, and (2) if the solenoid 158 is still not moving, after a timer, a higher static friction current is added. In most cases, the smaller static friction is enough to overcome the gear binding after the timer set. However, if after the timer the solenoid 158 is still not moving, the higher current is needed to ensure disconnect travels to the end and the disconnect is successfully engaged. As mentioned above, the end-stop positions can always be recorded at the end of travel so that the algorithm dynamically updates the end-stop positions 170*a*, 170*b* so that the solenoid 158 does not slam in them and caused NVH.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An axle disconnect control system for an axle disconnect system of a vehicle, the axle disconnect system including a dog clutch, the axle disconnect control system comprising:

a position sensor configured to measure a position of a solenoid of the dog clutch, wherein the solenoid is configured to move a first gear of the dog clutch to engage/disengage with a second gear of the dog clutch, wherein the first gear is connected to a powertrain of the vehicle and the second gear is connected to an axle or a wheel of the vehicle; and a control system configured to perform, based on the measured position of the solenoid, velocity-based control of the solenoid to engage/disengage the first and second dog clutch gears to connect/disconnect the axle or the wheel of the vehicle to/from the powertrain of the vehicle, respectively, wherein the velocity-based control of the solenoid to engage the first and second dog clutch gears to connect the axle or the wheel to the powertrain comprises:

(i) increasing a velocity of the solenoid to a target speed during a first period followed by (ii) holding the velocity of the solenoid constant at the target speed for a second period up until initial contact between the first and second dog clutch gears; and (iii) after the initial contact between the first and second dog clutch gears, increasing the velocity of the solenoid above the target speed during a third period corresponding to a gear binding region followed by (iv) after gear binding between the first and second dog clutch gears, decreasing the velocity of the solenoid to zero during a fourth period as the solenoid approaches one of two end-stop positions.

2. The axle disconnect control system of claim 1, wherein the control system is further configured to learn the two end-stop positions of the solenoid (i) before the first period and (ii) during or after the fourth period.

3. The axle disconnect control system of claim 1, wherein the velocity-based control of the solenoid to disengage the first and second dog clutch gears to disconnect the axle or the wheel from the powertrain comprises (i) increasing the velocity of the solenoid to the target speed during the first period corresponding to a gear binding region and up until the first and second dog clutch gears begin to disengage from each other.

4. The axle disconnect control system of claim 3, wherein the velocity-based control of the solenoid to disengage the first and second dog clutch gears to disconnect the axle or the wheel from the powertrain further comprises (ii) after increasing the velocity of the solenoid to the target speed during the first period, holding the velocity of the solenoid constant at the target speed during the second period followed by (iii) decreasing the velocity of the solenoid to zero during the third period as the solenoid approaches one of the two end-stop positions.

5. The axle disconnect control system of claim 4, wherein the control system is further configured to learn the two end-stop positions of the solenoid (i) before the first period and (ii) during or after the third period.

6. The axle disconnect control system of claim 1, wherein the axle disconnect system is a front axle disconnect (FAD) system, the axle is a front axle of the vehicle, and the FAD system is configured to connect/disconnect the front axle from the powertrain.

7. The axle disconnect control system of claim 1, wherein the axle disconnect system includes a wheel end disconnect (WED) system configured to connect/disconnect the wheel to/from the powertrain.

8. The axle disconnect system of claim 7, wherein the axle disconnect system includes a pair of WED systems, the axle is a front axle of the vehicle, and the WED systems are configured to connect/disconnect a pair of front wheels of the vehicle to/from the front axle.

9. An axle disconnect control method for an axle disconnect system of a vehicle, the axle disconnect system including a dog clutch, the axle disconnect control method comprising:

monitoring, by a control system of the vehicle and using a position sensor for a solenoid of the dog clutch, a position of the solenoid, wherein the solenoid is configured to move a first gear of the dog clutch to engage/disengage with a second gear of the dog clutch, wherein the first gear is connected to a powertrain of the vehicle and the second gear is connected to an axle or a wheel of the vehicle; and performing, by the control system and based on the position of the solenoid as provided by the position sensor, velocity-based control of the solenoid to engage/disengage the first and second dog clutch gears to connect/disconnect the axle or the wheel of the vehicle to/from the powertrain of the vehicle, respectively, wherein the velocity-based control of the solenoid to engage the first and second dog clutch gears to connect the axle or the wheel to the powertrain comprises:

(i) increasing, by the control system, a velocity of the solenoid to a target speed during a first period followed by (ii) holding, by the control system, the velocity of the solenoid constant at the target speed for a second period up until initial contact between the first and second dog clutch gears, (iii) after the initial contact between the first and second dog clutch gears, increasing, by the control system, the velocity of the solenoid above the target speed during a third period corresponding to a gear binding region followed by (iv) after gear binding between the first and second dog clutch gears, decreasing, by the control system, the velocity of the solenoid to zero during a fourth period as the solenoid approaches one of two end-stop positions.

10. The axle disconnect control method of claim 9, further comprising learning, by the control system, the two end-stop positions of the solenoid (i) before the first period and (ii) during or after the fourth period.

11. The axle disconnect control method of claim 9, wherein the velocity-based control of the solenoid to disengage the first and second dog clutch gears to disconnect the axle or the wheel from the powertrain comprises (i) increasing, by the control system, the velocity of the solenoid to the target speed during the first period corresponding to a gear binding region and up until the first and second dog clutch gears begin to disengage from each other.

12. The axle disconnect control method of claim 11, wherein the velocity-based control of the solenoid to disengage the first and second dog clutch gears to disconnect the axle or the wheel from the powertrain further comprises (ii) after increasing the velocity of the solenoid to the target speed during the first period, holding, by the control system, the velocity of the solenoid constant at the target speed during the second period followed by (iii) decreasing, by the control system, the velocity of the solenoid to zero during the third period as the solenoid approaches one of the two end-stop positions.

13. The axle disconnect control method of claim 12, further comprising learning, by the control system, the two end-stop positions of the solenoid (i) before the first period and (ii) during or after the third period.

14. The axle disconnect control method of claim 9, wherein the axle disconnect system is a front axle disconnect (FAD) system, the axle is a front axle of the vehicle, and the FAD system is configured to connect/disconnect the front axle from the powertrain.

15. The axle disconnect control method of claim 9, wherein the axle disconnect system includes a wheel end disconnect (WED) system configured to connect/disconnect the wheel to/from the powertrain.

16. The axle disconnect method of claim 15, wherein the axle disconnect system includes a pair of WED systems, the axle is a front axle of the vehicle, and the WED systems are configured to connect/disconnect a pair of front wheels of the vehicle to/from the front axle.

17. An axle disconnect control method for an axle disconnect system of a vehicle, the axle disconnect system including a dog clutch, the axle disconnect control method comprising:

monitoring, by a control system of the vehicle and using a position sensor for a solenoid of the dog clutch, a position of the solenoid, wherein the solenoid is configured to move a first gear of the dog clutch to engage/disengage with a second gear of the dog clutch, wherein the first gear is connected to a powertrain of the vehicle and the second gear is connected to an axle or a wheel of the vehicle; and performing, by the control system and based on the position of the solenoid as provided by the position sensor, velocity-based control of the solenoid to engage/disengage the first and second dog clutch gears to connect/disconnect the axle or the wheel of the vehicle to/from the powertrain of the vehicle, respectively, wherein the velocity-based control of the solenoid to disengage the first and second dog clutch gears to disconnect the axle or the wheel from the powertrain comprises:

(i) increasing, by the control system, a velocity of the solenoid to a target speed during a first period corresponding to a gear binding region and up until the first and second dog clutch gears begin to disengage from each other, and (ii) after increasing the velocity of the solenoid to the target speed during the first period, holding, by the control system, the velocity of the solenoid constant at the target speed during a second period followed by (iii) decreasing, by the control system, the velocity of the solenoid to zero during a third period as the solenoid approaches one of two end-stop positions.

18. The axle disconnect control method of claim 17, further comprising learning, by the control system, the two end-stop positions of the solenoid (i) before the first period and (ii) during or after the third period.

19. The axle disconnect control method of claim 17, wherein the axle disconnect system is a front axle disconnect (FAD) system, the axle is a front axle of the vehicle, and the FAD system is configured to connect/disconnect the front axle from the powertrain.

20. The axle disconnect control method of claim 17, wherein the axle disconnect system includes a wheel end disconnect (WED) system configured to connect/disconnect the wheel to/from the powertrain.

* * * * *